United States Patent
Bogovac

(10) Patent No.: US 7,783,908 B2
(45) Date of Patent: Aug. 24, 2010

(54) METHOD AND DEVICE TO WAKE-UP NODES IN A SERIAL DATA BUS

(75) Inventor: Davor Bogovac, Kallered (SE)

(73) Assignee: Freescale Semiconductor, Inc., Austin, TX (US)

( * ) Notice: Subject to any disclaimer, the term of this patent is extended or adjusted under 35 U.S.C. 154(b) by 566 days.

(21) Appl. No.: 11/569,332

(22) PCT Filed: Apr. 26, 2005

(86) PCT No.: PCT/EP2005/051879

§ 371 (c)(1),
(2), (4) Date: Nov. 17, 2006

(87) PCT Pub. No.: WO2005/107151

PCT Pub. Date: Nov. 10, 2005

(65) Prior Publication Data

US 2008/0276107 A1    Nov. 6, 2008

(30) Foreign Application Priority Data

May 3, 2004    (EP)    ................................. 04291127

(51) Int. Cl.
G06F 1/32    (2006.01)
G06F 1/26    (2006.01)
H03L 5/00    (2006.01)

(52) U.S. Cl. .................. 713/323; 713/300; 713/320; 327/333

(58) Field of Classification Search .................. 713/323, 713/300, 320; 327/333
See application file for complete search history.

(56) References Cited

U.S. PATENT DOCUMENTS

| 4,987,317 | A  |   | 1/1991  | Pournain et al. |
| 6,470,393 | B1 | * | 10/2002 | Heinrich et al. ............. 709/238 |
| 6,593,845 | B1 | * | 7/2003  | Friedman et al. ......... 340/10.33 |

(Continued)

FOREIGN PATENT DOCUMENTS

WO    WO03104036    * 12/2003

OTHER PUBLICATIONS

Bosch; "CAN Specification"; 1991, Robert Bosch GmbH, postfach 30 02 40, D-70442 Stuttgart, Germany.

(Continued)

*Primary Examiner*—Vincent T Tran

(57) ABSTRACT

A method of communication comprising sending communication signals switched between dominant and recessive values at clock intervals in frames over a serial data bus from at least one of a plurality of sending nodes to a plurality of receiving nodes. The receiving nodes have an operational state and a standby state in which the current consumption of the node is reduced compared to the operational state. The receiving nodes include wake-up trigger means for triggering transition from the standby state to the operational state in response to the communication signals. The frames of the transmitted signals include an identifier field during which the communication signal alternates between the dominant and recessive values in successive clock intervals with at least one significant occurrence during which the communication signal remains at one of the dominant and recessive values during at least two successive clock intervals, and the trigger means is selectively responsive to the position of the occurrence within the identifier field for triggering the transition from the standby state to the operational state.

16 Claims, 3 Drawing Sheets

U.S. PATENT DOCUMENTS

| | | | | |
|---|---|---|---|---|
| 6,694,440 | B1 * | 2/2004 | Ishibashi | 713/310 |
| 6,795,009 | B2 * | 9/2004 | Duffy et al. | 341/155 |
| 7,106,174 | B1 * | 9/2006 | Powell | 340/10.2 |
| 7,277,737 | B1 * | 10/2007 | Vollmer et al. | 455/574 |
| 2002/0126824 | A1 * | 9/2002 | Lin et al. | 379/229 |
| 2002/0161557 | A1 * | 10/2002 | Freed | 702/188 |
| 2003/0169774 | A1 * | 9/2003 | Del Prado Pavon et al. | 370/503 |
| 2004/0012432 | A1 | 1/2004 | Muth | |
| 2004/0057509 | A1 * | 3/2004 | Porat et al. | 375/222 |
| 2006/0075086 | A1 * | 4/2006 | Muth | 709/224 |

OTHER PUBLICATIONS

L4969 Product Preview; "System Voltage Regulator with Fault Tolerant Low Speed Can-Transceiver"; Sep. 2000; 30 pages; STMicroelectronics.

* cited by examiner

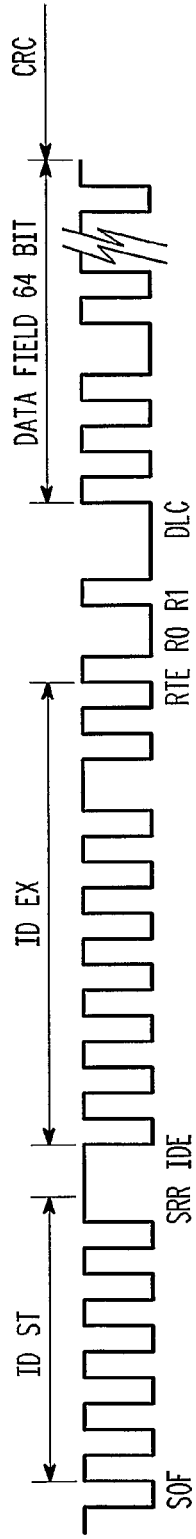

FIG. 3

WAKE UP ID = 25, CAN ID 0xAAAAAA5
WAKE UP DATA/FUNCTION = 7, CAN DATA FIELD 0x54, 0xAA, 0xAA, 0xAA, 0xAA, 0xAA, 0xAA, 0xAA

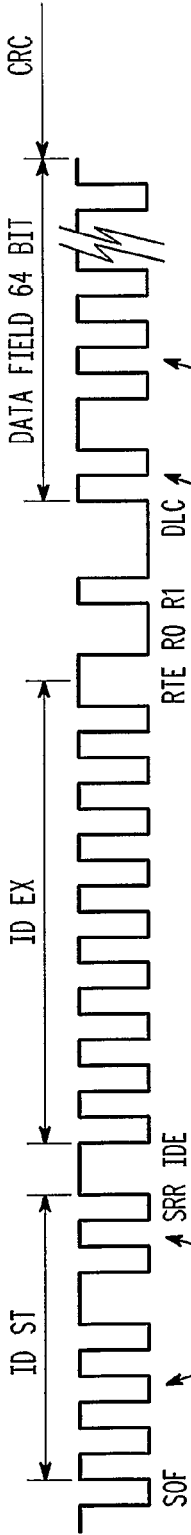

FIG. 4

WAKE UP ID = 7, CAN ID 0xA9AAAAA
WAKE UP DATA/FUNCTION = 3, CAN DATA FIELD 0x4A, 0xAA, 0xAA, 0xAA, 0xAA, 0xAA, 0xAA, 0xAA

ONLY PATTERNS WHERE 1 OCCURENCE OF 2 RECESIVE BITS (PER ID AND DATA) THAT ARE PRECEDED AND FOLLOWED BY AN ALTERNATING BIT PATTERN ARE VALID. ALL OTHER PATTERNS ARE IGNORED.

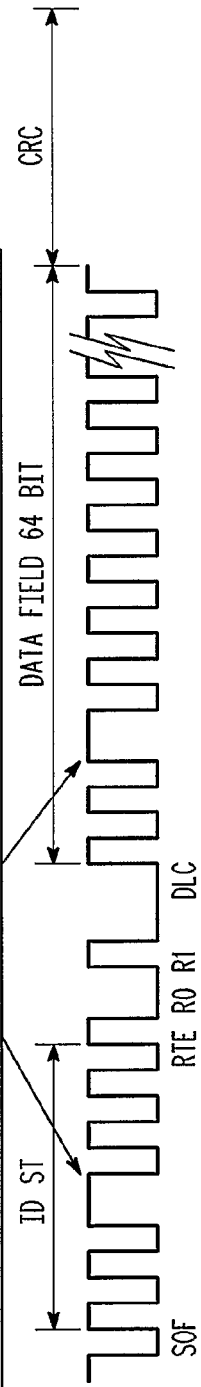

FIG. 5

THE POSITION OF 2 CONSECUTIVE RECESIVE BITS DETERMINES THE SENDER ID AND DATA/FUNCTION

WAKE UP ID = 5, CAN ID 0x295
WAKE UP DATA/FUNCTION = 5, CAN DATA FIELD 0xAD, 0x55, 0x55, 0x55, 0x55, 0x55, 0x55, 0x55

METHOD AND DEVICE TO WAKE-UP NODES IN A SERIAL DATA BUS

FIELD OF THE INVENTION

This invention relates to a serial data bus communication system and more particularly to wake-up of nodes in such a system.

BACKGROUND OF THE INVENTION

Local networks often make use of a communication bus, over which a set of nodes communicates. A driver module in a node acting as a master node applies a voltage to the line, the driver module being switched to produce step changes in the voltage applied to the line to transmit signals over the line to receivers in remote nodes acting as slave nodes. The line also selectively transmits signals from the remote nodes back to a central processing unit. It will be appreciated that certain nodes may be capable of acting both as a master and as a slave node.

Such a bus is used in automotive vehicles, for example. Historically, in automotive applications, functions such as door locks, seat positions, electric mirrors, and window operations have been controlled directly by electrical direct current delivered by wires and mechanical power switches. Such functions may today be controlled by ECUs (Electronic Control Units) together with sensors and actuators in a multiplexed Controller Area Network (CAN). The Controller Area Network (CAN) standard (ISO 11898) allows data to be transmitted by switching a voltage, at a frequency of 250 kbauds to 1 Mbaud for example, to the multiplexed receiver modules over the twisted pair cable. The receiver modules may be actuators that perform a function in response to the signal received, for example by generating mechanical power required or, in the case of sensors, by responding to activation by making measurements and sending the results back to the ECU over the bus.

The CAN bus was designed to be used as a vehicle serial data bus, and satisfies the demands of real-time processing and reliable operation in a vehicle's environment, is cost-effective, and provides a reasonable data bandwidth. However, connecting with the main body network directly via a CAN bus system can be expensive because of increased costs per node and because high overall network traffic can make management extremely difficult. To help reduce costs, the logical extension is to structure the network hierarchically. Among other features, this leads to multicast reception, multi-master operation and message filtering.

A variant on the CAN standard is the LIN (Local Interconnect Network) sub-bus standard (see ISO 7498), which is an extension to the CAN bus, at lower speed and on a single wire bus, to provide connection to local network clusters. A LIN sub-bus system uses a single-wire implementation (enhanced ISO9141), which can significantly reduce manufacturing and component costs. Component costs are further reduced by self-synchronization, without crystal or ceramics resonator, in the slave node. The system is based on common Universal asynchronous receiver and transmitter serial communications interface (UART/SCI) hardware that is shared by most microcontrollers, for a more flexible, lower-cost silicon implementation.

Another related standard is the proposed FlexRay standard. FlexRay is a network communication system targeted specifically at the next generation of automotive applications or 'by-wire' applications.

It is important for the current consumption of the nodes of the system to be very low, especially where such systems are powered by a battery or accumulator as in automotive applications. Accordingly, the nodes of the system have standby modes of operation, in which current consumption is reduced when activation of the node is not necessary.

In the case of automotive vehicles, especially cars, the current consumption when the engine is not running is starting to become a very serious problem. The reason is the increase in the number of nodes and other modules and functions that have to be active even while the engine is stopped. The main problem is when the car is parked locked for long periods. By way of example, typical current consumption requirements in the car industry today in parked/locked mode for modules connected directly to the battery are:

100 uA at 12V per module
20 mA at 12V for the whole car
parked for 40 days at −40 degrees C. with enough current left in the battery to start the engine.

These requirements are very hard to meet with the complex local networks that are being used more and more in cars, since the master nodes repeatedly wake the slave nodes, for supervision functions, for example.

Each time a node wakes up in response to a signal applied to the bus, it consumes more current than in the standby mode. Accordingly, it is desirable to include in all relevant nodes a wake-up trigger that is sensitive to an identifier ('ID') field of a signal transmitted by a node acting as a master node and selectively wakes up the receiver node only if the received signal contains that ID.

It would be desirable for the network to be capable of handling more than one ID identifying different master nodes as source. This would improve the functionality of the system: in particular, the network could contain more than one master node that could wake slave nodes in standby mode ('multi-master'), which would otherwise not be possible since it is not acceptable for two or more master nodes to send signals with the same ID. Also, this would enable different groups of slave nodes to wake in response to different master nodes in the same network ('multicast'). This makes it desirable for the slave nodes to be capable of storing a settable ID corresponding to a selected one of the different IDs, or even more than one settable ID so that they can be woken by more than one master node.

It is also important to minimise the complexity and sophistication of the wake-up part of the slave node that detects the ID, since this will tend to increase its cost and especially its current consumption.

SUMMARY OF THE INVENTION

The present invention provides a method of communication over a serial data bus, and a node for use in such a method, as described in the accompanying claims.

BRIEF DESCRIPTION OF THE DRAWINGS

FIG. 3 is a diagram of one example of the variation with time of signals sent over a bus in the network of FIG. 1, FIG. 4 is a diagram of another example of the variation with time of signals sent over a bus in the network of FIG. 1, and FIG. 5 is a diagram of yet another example of the variation with time of signals sent over a bus in the network of FIG. 1

DETAILED DESCRIPTION OF THE PREFERRED EMBODIMENTS

Figure 1:
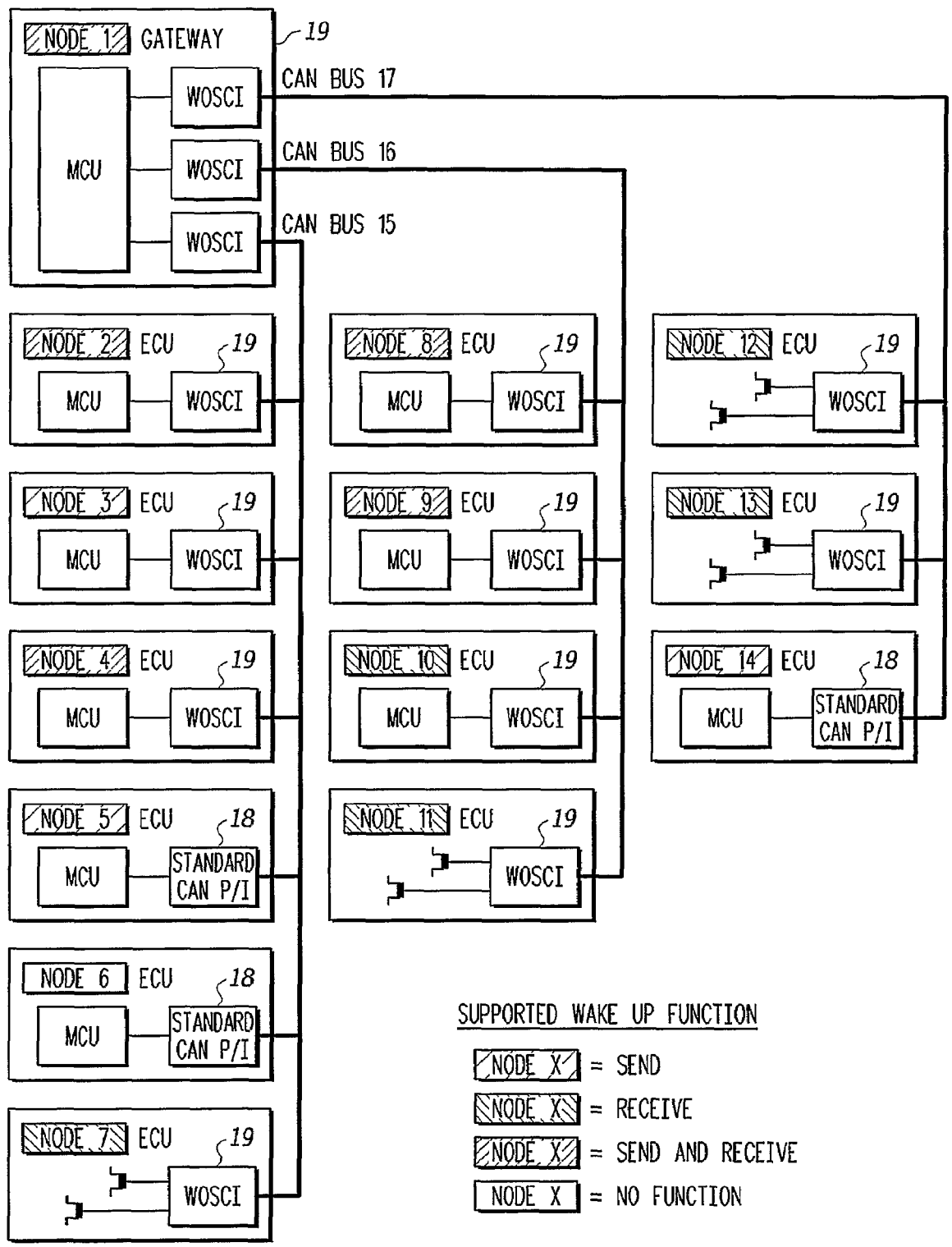
FIG. 1 is a block schematic diagram of a controller area network (CAN) in accordance with one embodiment of the invention, given by way of example.

FIG. 1 shows an example of a controller area network (CAN) in accordance with an embodiment of the present invention comprising nodes 1 to 14. The node 1 comprises a gateway connected to CAN buses 15, 16, and 17. The nodes 2 to 7 are connected to the bus 15; the nodes 8 to 11 are connected to the bus 16, and the nodes 12 to 14 are connected to the bus 17. By way of example, different configurations of nodes are illustrated, in which the gateway node 1 and the nodes 2, 4, 8 and 9 are capable of both sending and receiving wakeup commands. The nodes 3, 5 and 14 are capable of sending wakeup commands but not receiving them. The nodes 7, 10, 11, 12 and 13 are capable of receiving wakeup commands but not sending them. And the node 6 is not capable of either sending or receiving a wakeup command. Those nodes that are not capable of receiving wakeup commands therefore comprise internal wake-up modules that are activated even in the standby state of those nodes so that those nodes wake themselves up as required.

The nodes 1 to 6, 8 to 10 and 14 include micro-controller units ("MCU") that are in communication with the CAN buses 15, 16, and 17. The nodes 7, 11, 12 and 13 include field effect transistors that are controlled from the CAN buses 15, 16, and 17 instead of an MCU. The nodes 5 and 6 include standard CAN physical interface modules 18 in accordance with the CAN standard ISO11898. Each of the other nodes 1 to 4 and 7 to 14 includes one or more interface modules 19 for processing specific CAN ID wakeup signals, in accordance with this embodiment of the present invention. It will be appreciated that the configurations shown in FIG. 1 are purely illustrative, and the number of nodes and their nature will be adapted to suit the particular network application.

Figure 2:
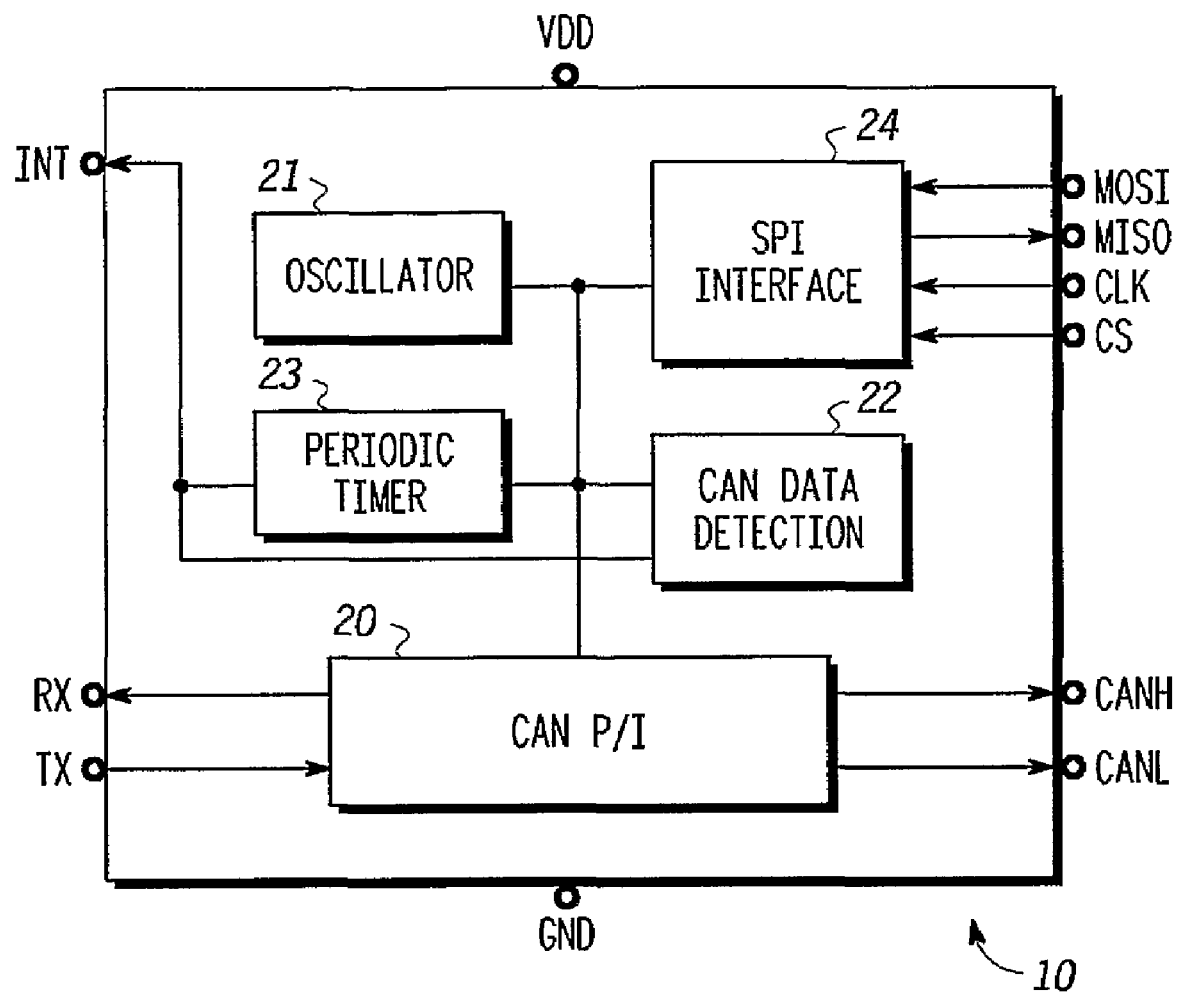
FIG. 2 is a block schematic diagram of a wake-up module in a node in the network of FIG. 1.

An interface module 19 for a node in accordance with an embodiment of the present invention is shown in FIG. 2. It comprises a CAN physical interface unit 20 connected to the CAN lines CANH and CANL. The node also comprises an oscillator 21 providing an internal clock for non-synchronous data. The oscillator 21 is a relatively low-cost oscillator whose frequency is set by a resistive-capacitive ("RC") time constant circuit. Signals received over the CAN bus lines by the interface 20 are sent to the MCU of the node through a terminal Rx and signals to be transmitted over the CAN bus lines by the interface 20 are received from the MCU at a terminal Tx. A CAN data detector 22 is connected to receive signals through the interface 20 from the CAN bus lines and to receive the clock signal from the oscillator 21. The detector 22 provides a signal to wake up the MCU over a terminal INT. A timer 23 is also connected to receive the clock signals from the oscillator 21 and generate an internal wakeup signal over the terminal INT with a time delay settable between 100 ms and 1 hour for those nodes that need to activate a function repetitively, for example, without requiring a trigger from the CAN bus.

A synchronous parameter interface 24 is connected to set and read parameters for the CAN data detector 22 and the timer 23, the synchronous interface 24 being connected to the MCU through a terminal MOSI when the MCU is acting as a master sending out signals to a remote slave, through a terminal MISO when the MCU is acting as a slave for receiving signals from a remote master, through a terminal CLK for receiving synchronised clock signals from the MCU for serial synchronous data and through a terminal CS for receiving a chip select signal from the MCU. The interface module 19 also has a power supply terminal VDD and an earth connection GND.

In operation, the physical interfaces 18 and 20 of those nodes that transmit apply pulsed voltages to the lines CANH and CANL. The voltages can have one of two complementary logical values: 'dominant' or 'recessive'. Application of a dominant value to the bus lines by any node will produce the dominant value and only if no node is applying the dominant value to the bus lines will there be a recessive value on the bus. A node is a transmitter if it originates a message on the bus lines and is a receiver if it is not the transmitter of that message and the bus is not idle. In accordance with the CAN specification, the signals transmitted comprise an identifier ("ID") field and a data field. The ID field may be a standard 11 byte identifier ID St in each frame or the standard identifier may be extended by an extended ID field ID Ex comprising a further 18 bytes, as shown in FIGS. 3 and 4.

The signal pattern applied to the ID field constitutes a code that identifies the sender of the frame. The function to be performed by the receiver may be identified by a further ID pattern in the data field. The ID patterns are used by the receiver's nodes in this embodiment of the invention to select which received signals they will respond to and, in particular, the detector 22 of a receiver node will only trigger waking up of the MCU of that node by applying a signal to the terminal INT if the pattern of the ID field of the frame corresponds to the parameters set by the synchronous parameter interface 24 for that node. Similarly, certain nodes can be set to trigger waking up of the MCU of that node by applying a signal to the terminal INT only if the ID pattern of the data field of the frame also corresponds to the parameters set by the synchronous parameter interface 24 for the function of that node.

The detector 22 does not have to calculate error check fields in the frame nor send acknowledge signals during its standby state, since they are only necessary once the MCU has woken up. The principle of this embodiment of the invention is that if a master node is actively transmitting on the bus it will send the wakeup message repeatedly until another node wakes up and the MCU acknowledges the sent frame.

FIGS. 3, 4 and 5 show examples of the ID fields transmitted in this embodiment of the present invention. In each case, during the ID field, the values on the bus lines alternate between dominant and recessive values in successive clock intervals. At one particular position in the ID field, there is an occurrence of the signal remaining at the same value during two successive clock intervals, the position of this occurrence defining the identity of the sender node. In the embodiments shown in FIGS. 3 to 5, it is the occurrence of two successive recessive values of the signals that is significant.

At the receiver nodes, the physical interface 20 and the detector 22 respond to the alternating values of the signal during the ID field and selectively, if and only if the position of the occurrence of the signal remaining at the same value for two successive clock intervals corresponds to a position defined by the synchronous parameter interface 24, the detector 22 applies a wakeup signal to the terminal INT to wake up the MCU.

It will be appreciated that the position of the occurrence could be defined by the signal on the bus line remaining at the same value for more than two clock intervals; however, the more clock intervals are used in this way to define the position, the fewer different combinations can be used for different IDs. In this embodiment of the invention, the ID pattern consists of the signal remaining at the same value (recessive)

for only two successive clock intervals, preceded immediately by and followed immediately by the complementary value (dominant).

In the example illustrated in FIG. 3, the ID transmitted is at the position of the 25$^{th}$ pulse in the ID field, that is to say the 14$^{th}$ pulse in the extended ID field ID Ex. The function ID in the data field is similarly defined by the signal on the bus remaining at the same value for two successive clock intervals and in FIG. 3 this occurs at the 7$^{th}$ clock interval in the data field.

In the example illustrated in FIG. 4, the ID position occurs at the 7$^{th}$ clock interval, in the standard ID field ID St, although the protocol corresponds to the extended ID field ID Ex, offering 29 possible positions. FIG. 5 corresponds to the standard ID protocol, in which the ID field consists of 11 clock intervals only in the field ID St, the ID position occurring at the 5$^{th}$ clock interval in the ID field and the function ID occurring at the 5$^{th}$ dock interval in the data field.

It will be appreciated that, in accordance with the CAN bus specifications, other clock intervals are used for defining start of frame ("SOF"), remote transmission request ("RTR"), reserved intervals ("R0, R1"), data length code ("DLC") and, in the case of the extended ID protocol, substitute remote request ("SRR") and ID extended ("IDE"), certain of these intervals being interspersed in the ID fields.

The detector 22 may include a register receiving the signal from the bus through the interface 20, the register being clocked by the clock signal from the oscillator 21, so as to detect and selectively respond to ID signals in which the significant position corresponds to a number of intervals defined by the internal clock signal and corresponding to an identifier value stored in the detector under the control of the synchronous parameter interface 24.

The accuracy of the frequency of the oscillator 21 need not be high. If desired, the oscillator may be synchronised in phase relative to the signal detected on the bus and it is possible for the protocol to include a synchronisation field in the frames before the identifier field in which the communication signal alternates between the dominant and recessive values for facilitating the synchronisation. However, in the embodiments of the invention illustrated in FIGS. 3 to 5, such a synchronisation field is not used.

In order to reduce erroneous wakeup actions, which would unnecessarily increase consumption, the detector 22 is preferably selectively responsive to occurrences of two successive clock intervals in which the signal on the bus remains the same followed immediately by a clock interval in which the signal changes to the complementary value. Similarly, the detector 22 preferably responds selectively if the signal on the bus remains at the same value during two successive clock intervals after having changed from the complementary value in the immediately preceding clock interval. In the embodiment of the invention shown in the drawings, these features are combined so that the detector 22 only responds if the signal has a dominant value at one clock interval, a recessive value in the next two clock intervals, followed immediately by a dominant value in the next clock interval.

It will be appreciated that, with the embodiment of the invention shown in the accompanying drawings, the network is capable of handling more than one ID identifying different master nodes as source, so that the network can contain more than one master node but the slave node will only wake up in response to a signal from a master node having the ID programmed by its synchronous parameter interface 24, that is to say the network can be a multi-master network. Also, any one of the master networks may wake groups of slave nodes ("multicast") if the receiver nodes are programmed with the corresponding ID. In addition, the synchronous parameter interface 24 of the nodes may program the detector 22 to respond to more than one different ID so that the slave node may be woken by more than one master node.

The current consumption of the wakeup module 19 may be very low, especially in the standby mode, since the complexity and sophistication of the physical interface 20, the oscillator 21, the detector 22, the timer 23 and the synchronous parameter interface 24 can be very low.

On the other hand, a relatively large number of different IDs are available to define the circumstances in which the MCU of a given node is woken up so that the network can ensure that the MCUs are only woken in circumstances where it is useful and justified.

The invention claimed is::

1. A method of communication in a multi-master system comprising:
   sending communication signals switched between dominant and recessive values at clock intervals in frames over a serial data bus from at least one of a plurality of sending nodes to a plurality of receiving nodes said frames including an identifier field, and said receiving nodes having an operational state and a standby state in which the current consumption of the node is reduced compared to said operational state, said receiving nodes including wake-up trigger circuitry for triggering transition from said standby state to said operational state in response to said communication signals;
   wherein said identifier field includes at least one position at which said communication signal remains at said recessive value during at least two successive clock intervals so as to define an identifier code, and said trigger circuitry is selectively responsive to said position for triggering said transition from said standby state to said operational state, the trigger circuitry of at least one of said receiving nodes being responsive to more than one different identifier code so as to be capable of being triggered by any one of a plurality of sending nodes.

2. A method of communication as claimed in claim 1, wherein said receiving nodes include clock circuitry for generating an internal clock signal and said trigger circuitry responds selectively to communication signals in which said position corresponds to a number of intervals defined by said internal clock signal and corresponding to an identifier value stored in said trigger circuitry.

3. A method of communication as claimed in claim 2, wherein said frames include, before said identifier field, a synchronisation field in which said communication signal alternates between said dominant and recessive values, and said trigger circuitry is responsive to said synchronisation field for controlling a phase of said clock signal.

4. A method of communication as claimed in claim 1, wherein said trigger circuitry is selectively responsive to said position if said communication signal remains at said recessive value during at least two successive clock intervals and changes to the dominant value in the following clock interval.

5. A method of communication as claimed in claim 1, wherein said trigger circuitry is selectively responsive to said position if said communication signal remains at said recessive value during at least two successive clock intervals having changed from the dominant value in the preceding clock interval.

6. A method of communication as claimed in claim 1, wherein said frames of said communication signals comprise a data field, said identifier field preceding said data field.

7. A method of communication as claimed in claim 6, wherein during said data field said communication signal alternates between said dominant and recessive values in successive clock intervals with at least one position at which said communication signal remains at one of said dominant and recessive values during at least two successive clock intervals.

8. A method of communication as claimed in claim 1, which is in conformity with Controller Area Network (CAN) standard.

9. A method of communication as claimed in claim 1, wherein said trigger circuitry is selectively responsive to said position if said communication signal remains at said recessive value during at least two successive clock intervals and changes to the dominant value in the following clock interval having changed from the dominant value in the preceding clock interval.

10. A method of communication comprising sending communication signals switched between dominant and recessive values at clock intervals in frames over a serial data bus from at least one of a plurality of sending nodes to a plurality of receiving nodes, said frames including an identifier field, and said receiving nodes having an operational state and a standby state in which the current consumption of the node is reduced compared to said operational state, said receiving nodes including wake-up trigger circuitry for triggering transition from said standby state to said operational state in response to said communication signals;

wherein said identifier field includes at least one position at which said communication signal remains at one of said dominant and recessive values during at least two successive clock intervals so as to define an identifier code, and said trigger circuitry is selectively responsive to said position for triggering said transition from said standby state to said operational state;

wherein said frames of said communication signals comprise a data field, said identifier field preceding said data field, and wherein during said data field said communication signal alternates between said dominant and recessive values in successive clock intervals with at least one position at which said communication signal remains at one of said dominant and recessive values during at least two successive clock intervals.

11. A method of communication as claimed in claim 10, wherein said receiving nodes include clock circuitry for generating an internal clock signal and said trigger circuitry responds selectively to communication signals in which said position in said identifier field corresponds to a number of intervals defined by said internal clock signal and corresponding to an identifier value stored in said trigger circuitry.

12. A method of communication as claimed in claim 11, wherein said frames include, before said identifier field, a synchronisation field in which said communication signal alternates between said dominant and recessive values, and said trigger circuitry is responsive to said synchronisation field for controlling a phase of said clock signal.

13. A method of communication as claimed in claim 10, wherein said trigger circuitry is selectively responsive to said position in said identifier field if said communication signal remains at said one of said dominant and recessive values during at least two successive clock intervals and changes to the complementary value in the following clock interval.

14. A method of communication as claimed in claim 10, wherein said trigger circuitry is selectively responsive to said position in said identifier field if said communication signal remains at said one of said dominant and recessive values during at least two successive clock intervals having changed from the complementary value in the preceding clock interval.

15. A method of communication as claimed in claim 10, which is in conformity with Controller Area Network (CAN) standard.

16. A method of communication as claimed in claim 10, wherein said trigger circuitry is selectively responsive to said position in said identifier field if said communication signal remains at said recessive value during at least two successive clock intervals and changes to the dominant value in the following clock interval having changed from the dominant value in the preceding clock interval.

* * * * *